United States Patent [19]
Shibayama

[11] Patent Number: 5,541,497
[45] Date of Patent: Jul. 30, 1996

[54] POWER STORING APPARATUS

[75] Inventor: Motoaki Shibayama, Takamatsu, Japan

[73] Assignees: Shikoku Denryoku Kabushiki Kaisha; Kabushiki Kaisha Shikoku Sogo Kenkyujo, both of Takamatsu, Japan

[21] Appl. No.: 162,184

[22] PCT Filed: Apr. 17, 1992

[86] PCT No.: PCT/JP92/00497

§ 371 Date: Dec. 16, 1993

§ 102(e) Date: Dec. 16, 1993

[87] PCT Pub. No.: WO93/21680

PCT Pub. Date: Oct. 28, 1993

[51] Int. Cl.$^6$ ........................................ H02K 7/02
[52] U.S. Cl. ........................ 322/4; 290/1 R; 290/49
[58] Field of Search ......................... 322/4; 290/49

[56] References Cited

U.S. PATENT DOCUMENTS

| | | | |
|---|---|---|---|
| 3,970,917 | 7/1976 | Diggs | 322/4 |
| 4,322,623 | 3/1982 | Grady | 250/402 |
| 4,723,735 | 2/1988 | Eisenhaure et al. | 244/165 |
| 4,725,766 | 2/1988 | Pinson | 322/4 |
| 4,926,107 | 5/1990 | Pinson | 322/4 |
| 5,245,270 | 9/1993 | Akiyama | 322/4 |

OTHER PUBLICATIONS

Yotsuya, Tsutom, Motoaki Shibayama and Ryoichi Takahata, "Characterization of High-Temperature Superconducting Bearing." *Advances in Cryogenic Engineering* 37 (1991): 1–6.

*Primary Examiner*—Steven L. Stephan
*Assistant Examiner*—Nicholas Ponomarenko
*Attorney, Agent, or Firm*—Keck, Mahin & Cate

[57] ABSTRACT

A power storing apparatus utilizes rotating flywheels. The casing of each flywheel is supported on the ground by an elastic member without fear of being rocked due to the rotation of a rotor. At least one pair of rotors, the rotors of which rotate in opposite directions to each other while producing the same rotation torque, is rotatably supported by a support supported on the ground through a suspending device which is capable of absorbing the vibration of an earthquake. Each rotor includes flywheels for maintaining the rotation of the corresponding rotor by an inertia force.

3 Claims, 8 Drawing Sheets

5,541,497

POWER STORING APPARATUS

TECHNICAL FIELD

The present invention relates to a power storing apparatus for storing electric power by a form of kinetic energy.

BACKGROUND ART

Studies have conventionally been made of a power storing apparatus for storing electric power by a form of kinetic energy.

Such a power storing apparatus is composed of a rotor having flywheels around the rotary shaft, a stator provided with a coil for supplying a driving power for rotating the rotor and taking out the induction electromotive force generated by the rotation of the rotor, a bearing means for rotatably supporting the rotary shaft of the rotor, and a casing accommodating the stator, the bearing and the rotor. This type of conventional power storing apparatus has a low earthquake resistance, because it is designed without leaving a surplus strength in order to reduce the friction loss of the bearing. Especially, in a bearing employing the pinning effect of a type II superconductor, rigidity is subject to a gradient of a magnetic field and therefore low. For example, it is rocked about 1 to 2 mm due to a burden corresponding to the weight of a rotor. In order to prevent the elements of the power storing apparatus from scattering at the time of an accident, the apparatus is often accommodated in a firm container.

There has also been an attempt at supporting the casing on the ground by an elastic member having a low spring constant in order to prevent vibration, which is caused by an earthquake or the like and which may dislocate the rotor, from being transmitted from the ground to the casing.

PROBLEMS TO BE SOLVED BY THE INVENTION

If the casing is supported by an elastic member having a low spring constant, as described above, then the counterforce of the rotation of the rotor which acts on the casing rocks the rotor, thereby making it difficult to support the rotor stably.

OBJECT OF THE INVENTION

Accordingly, it is an object of the present invention to eliminate the above-described problems in the related art and to provide a power storing apparatus which enables the casing to be supported on the ground with elasticity and without a fear of being rocked due to the rotation of the rotor.

DISCLOSURE OF THE INVENTION

To achieve this aim, the present invention provides a power storing apparatus comprising: a plurality of rotors each including flywheels for maintaining the rotation of the rotor by the inertia force; and an electric circuit for increasing or reducing the number of revolutions of each rotor so as to rotate the rotors in the opposite directions to each other by the same rotational frequency, wherein at least one pair of rotors is installed on the ground together with the corresponding bearings and casings through buffer devices.

According to a power storing apparatus of the present invention, since the number of rotations of one pair of rotors is controlled to be constantly equal within plus or minus 1%, the torques as a counterforce for fluctuating the input or the output cancel each other, so that the power storing apparatus is prevented from rocking. In addition, since the power storing apparatus is supported on the ground by a soft spring so that the natural or characteristic frequency of the apparatus is not more than 0.3, the force transmitted from the ground to the apparatus at the time of an earthquake is reduced to not more than 1/10. +dr

BEST MODE FOR CARRYING OUT THE INVENTION

The embodiments of the present invention in the best mode will be explained in the following with reference to the accompanying drawings.

Figure 1:
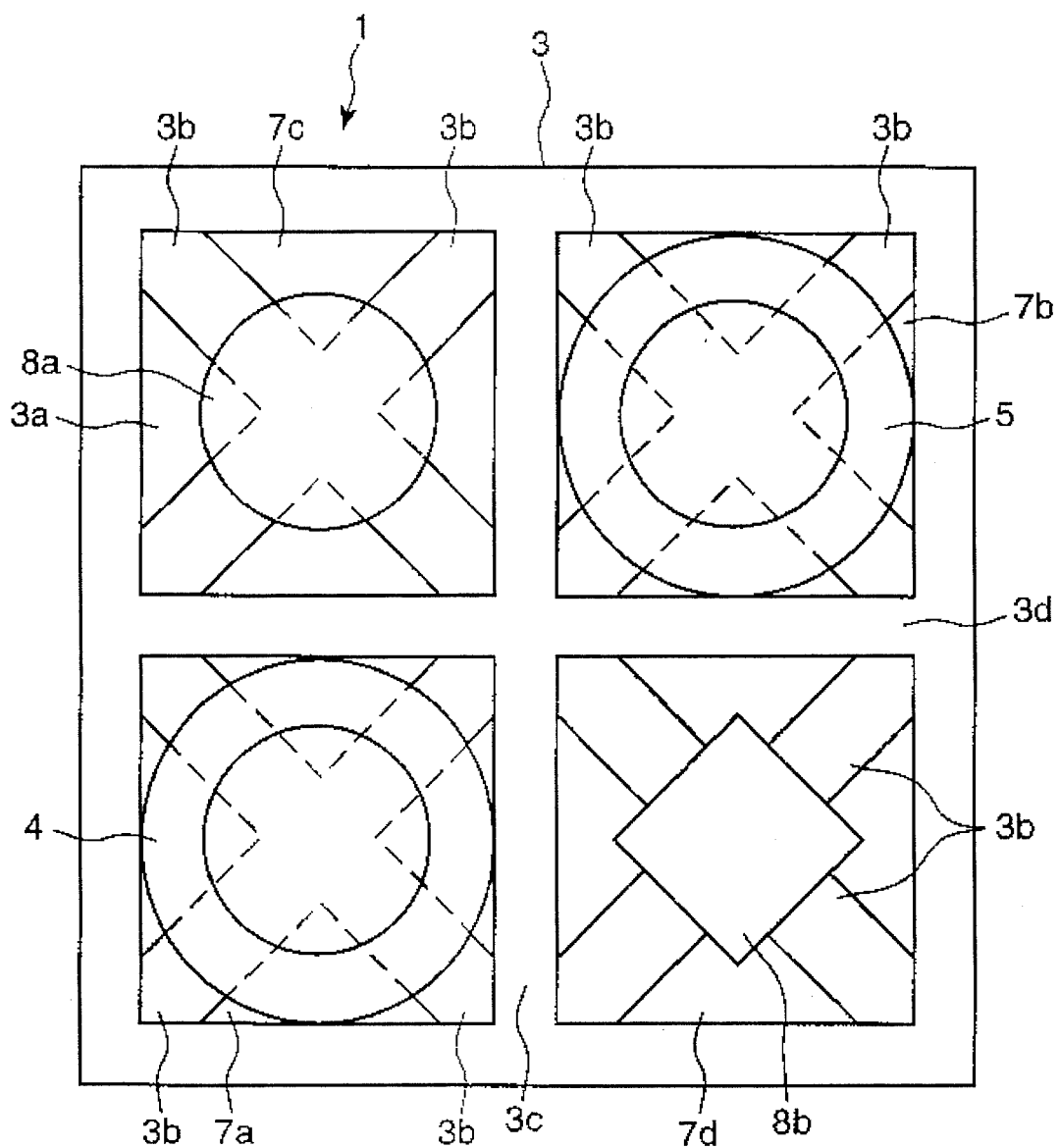
FIG. 1 shows the structure of a characteristic part of a first embodiment of a power storing apparatus according to the present invention.
Figure 3:
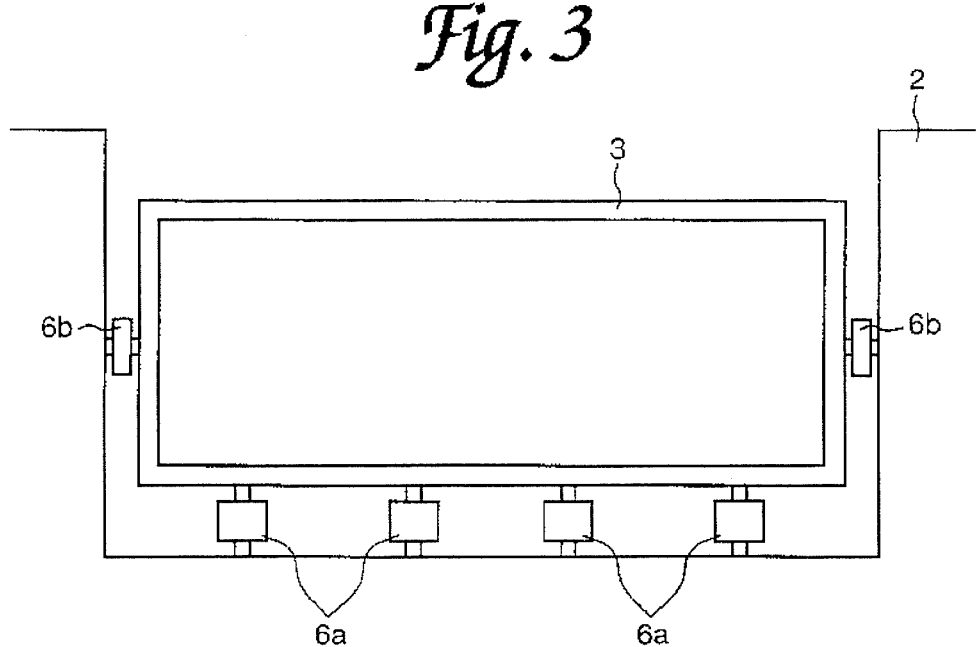
FIG. 3 is an explanatory view of the first embodiment which is installed on the ground.
Figure 4:
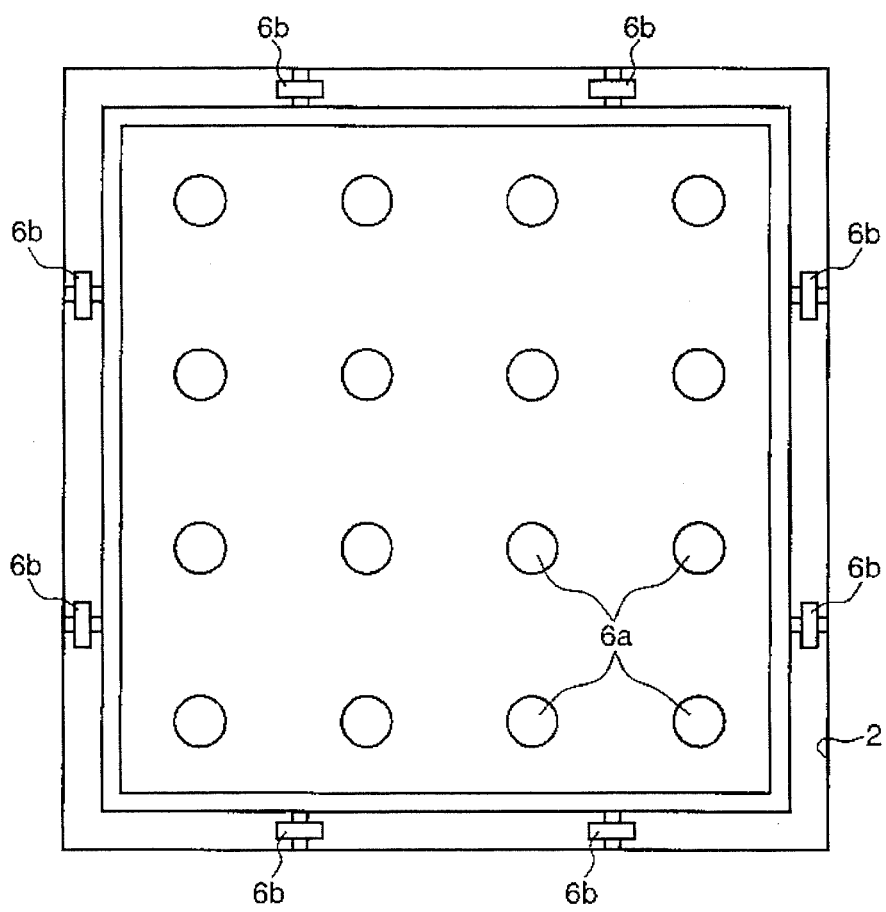
FIG. 4 is an explanatory view of the lower part of the supporting means of the first embodiment with air springs disposed therein.

FIG. 1 shows an embodiment of a power storing apparatus according to the present invention. In FIG. 1, the reference numeral 1 represents a power storing apparatus having an output ability of 6000 Kwh. The power storing apparatus 1 of this embodiment is installed in a concrete pit 2 formed in the firm ground shown in FIG. 3 and is provided with a steel block 3 which constitutes a supporting means. The concrete pit 2 is in the shape of a rectangular parallelepiped 11 meters square by 5 meters deep.

The block 3, which is 10 meters square by 5 meters high and weighs 20 t in this embodiment, accommodates one pair of casings 4 and 5. The block 3 is supported by 16 high-rigidity air springs 6a provided on the bottom surface of the pit 2 and medium-rigidity air springs 6b provided on the side walls of the pit 2 so as to urge the block 3 sideways. The rigidity of the air spring 6a in the axial direction is 10 t/meter and the burden thereof is 20 t. The burden of the air spring 6b is 10 t. It is possible to use a rubber vibration insulator in place of the high-rigidity air spring 6a and to use a coil spring in place of the air spring 6b.

Figure 5:
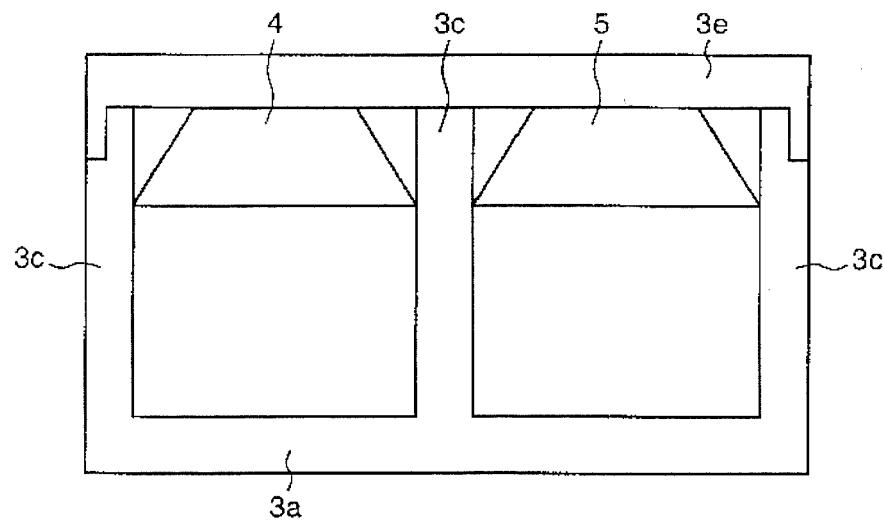
FIG. 5 is an explanatory view of the casings arranged in the block of the first embodiment.

The rigidity of the block 3 in the horizontal direction is 40 t/meter. The inside of the block 3 is divided into square storing chambers 7a to 7d by vertical walls 3c and 3d, and reinforcing girders 3b are erected in the diagonal directions of the squares on the bottom surface 3a of the block 3. The casings 4 and 5 are disposed in the storing chambers 7a and 7b, respectively, which are divided by the vertical walls 3c and 3d and situated on the diagonal line of the square bottom surface 3a. The casings 4, 5 are mounted on the intersecting portions of the girders 3b in the storing chambers 7a and 7b, respectively, and the side surfaces of the casings 4, 5 are fixed to the vertical walls 3c and 3d by bolts or the like. An air exhausting system 8a as a radiator is placed in the storing chamber 7c, and a control panel 8b for the power storing apparatus 1 is accommodated in the storing chamber 7d. The natural frequency of the block 3 in the horizontal direction is 0.2 Hz and that in the vertical direction is 0.3 Hz. The frequency of the vibration of an earthquake is not less than 1 Hz, which is not less than three times of the frequency of the block 3. As it is clear from FIG. 11, which analyzes the transmission of vibration, that the external force of the frequency not less than three times larger than the natural frequency is reduced to less than about 1/10, the block 3 is insusceptible to the vibration caused by an earthquake. When a rubber vibration insulator is used, the resistance to vertical rocking is insufficient, but since the vertical inertia force of 20 to 30% of the weight is only produced, the bearing can tolerate it. The upper part of the casings 4 and 5 are fixed to the upper lid 3e of the block 3, as shown in FIG. 5.

Figure 2:
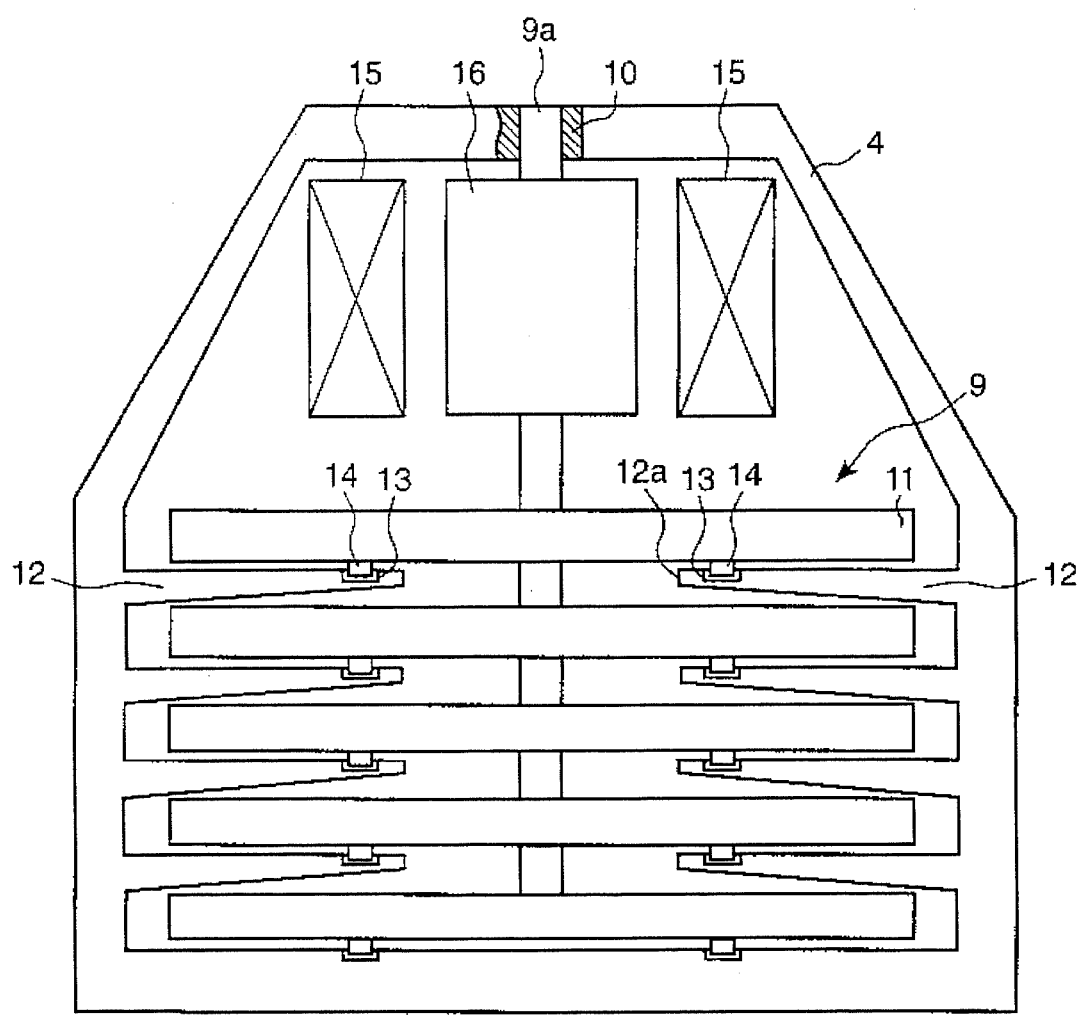
FIG. 2 is a sectional view of the structure of one casing of the first embodiment shown in FIG. 1.

The casings 4 and 5 constitute one pair, and each has an outer diameter of 5 meters, a height of 4 meters and a weight of 20 t. The pair of casings 4, 5 function as a supporting means as an element of the block 3. A rotor 9 having a weight of 30 t is rotatably supported in the casing 4, as shown in FIG. 2. A bearing 10 for supporting the rotary shaft 9a of the rotor 9 is provided on the upper wall of the casing 4, and flanges 12 for supporting the under surfaces of flywheels 11 of the rotor 9 are projected toward the side wall of the casing 4. The holding power of the flanges 12 in the upward direction is 100 t, the supporting power thereof in the downward direction is 10 t and the supporting power thereof in the horizontal direction is also 10 t.

A groove is provided on a circumference at the central portion of each of the flanges, and a superconductive pellet 13 is inserted into the groove. The superconductive pellet 13 is cooled by liquid nitrogen by a cooling device (not shown) provided within the flange 12. The superconductive pellet 13 together with a magnet 14 constitutes a bearing means for supporting the rotor 9 in a floated state. The rotor 9 is floated by the repulsing forces caused by the cooled superconductive pellet 13 and the magnet 14. The casing 5 is also provided with a rotor 9 which has the same mass and structure as those of the rotor 9 in the casing 4.

An armature 16 which is driven when a driving coil 15 provided in the casing 4 is energized is provided around the rotary shaft 9a of the rotor 9. The driving coils 15 and the armatures 16 in the casings 4 and 5 generate magnetic forces which rotate the rotors 9 in the opposite directions to each other. In other words, when the rotor 9 in the casing 4 rotates in the clockwise direction, in FIG. 1, the rotor 9 in the casing 5 rotates in the counterclockwise direction at the same speed, so that the torques generated by the rotors 9 in the casings 4 and 5 act in the opposite directions to each other. Since the torques generated by the rotors in the casings 4 and 5 and acting in the opposite directions are the same, and the casings 4 and 5 are fixed to the block 3, the torques generated by the rotations of the rotors 9 cancel each other, so that the counterforce generated by the rotations of the rotors 9 are not applied to the block 3 itself.

The flywheel 11 maintains the rotation of the rotor 9 as a whole by the inertia force when the energization of the driving coil 15 is stopped after the rotor 9 as a whole is driven by the driving coil 15. By connecting a load to the driving coil 15 when the rotor 9 as a whole is rotated by the inertia force, it is possible to take out the electric power. In this embodiment, the rotor 9 has a generating power of 3000 Kw. The effective facing area of one flywheel 11 for maintaining the rotation of the rotor 9 is 2 m, and one flywheel 11 has an elevating power of 20 t, a lowering power of 2 t, and a horizontal converging power of 2 t. In this embodiment, the rotor 9 has five flywheels 11, so that the flywheels 11 have an elevating power of 100 t in total.

According to the power storing apparatus 1 of this embodiment, when there is surplus power, if the rotors 9 are rotated by energizing the driving coils 15 accommodated in the casings 4 and 5 in the block 3, the rotors 9 are rotated at 4500 rpm at a maximum. At this time, although a torque of 8 tm is generated on each of the casings 4, 5, since the casings 4, 5 are fixed to the block 3 and the rotors 9 having the same mass in the casings 4, 5 rotate at the same speed in the opposite directions, the rotation torques generated by the rotors 9 cancel each other. That is, no counterforce is generated in the block 3 by the rotations of the rotors 9, so that the block 3 is prevented from rocking due to the rotations of the rotors 9. Since the block 3 is supported in the concrete pit 2 by the air springs 6a, 6b, the block 3 is insusceptible to the vertical or horizontal vibration caused by an earthquake.

Figure 6:
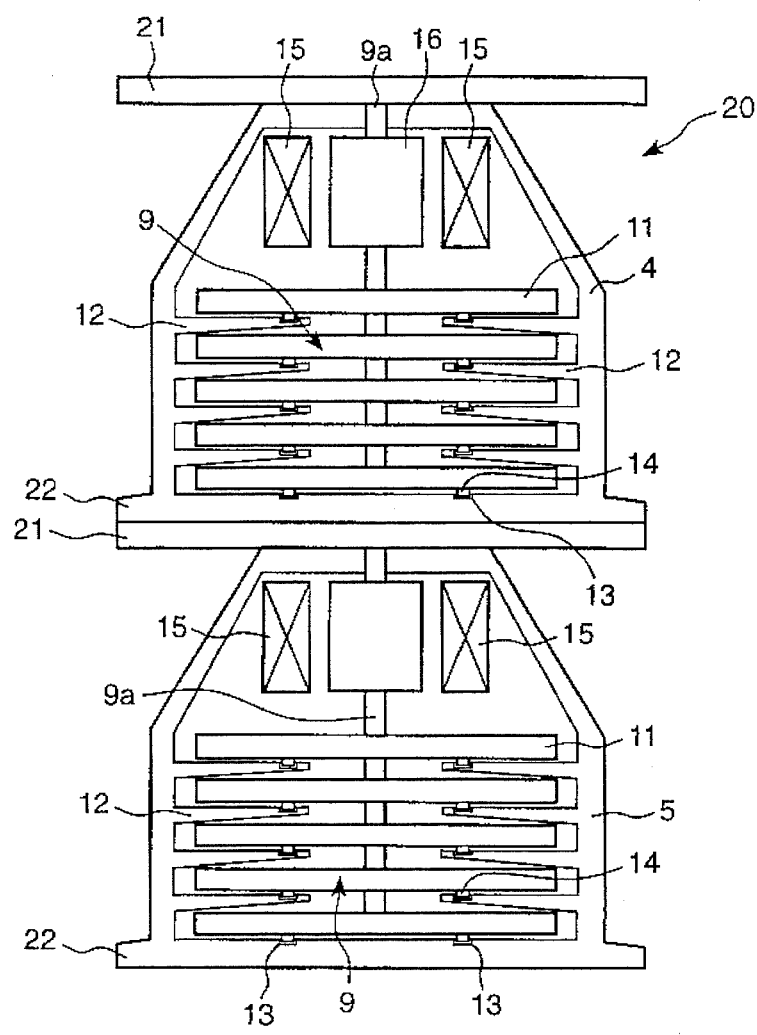
FIG. 6 is a sectional view of a second embodiment of a power storing apparatus according to the present invention, explaining the casings vertically arranged in the block.
Figure 7:
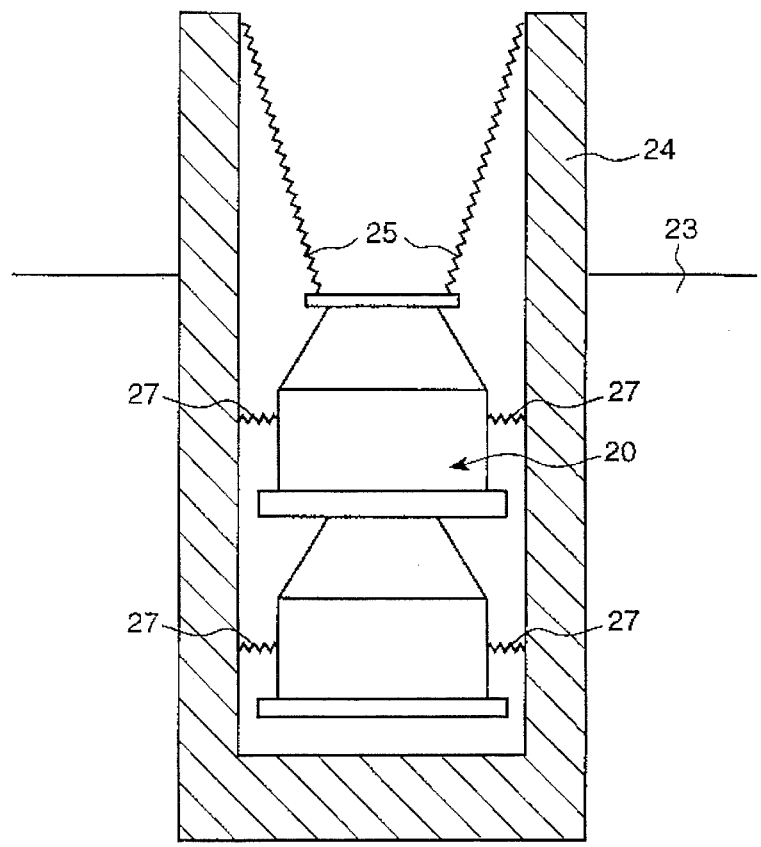
FIG. 7 is an explanatory view of the second embodiment of a power storing apparatus according to the present invention which is installed in a concrete pit.
Figure 8:
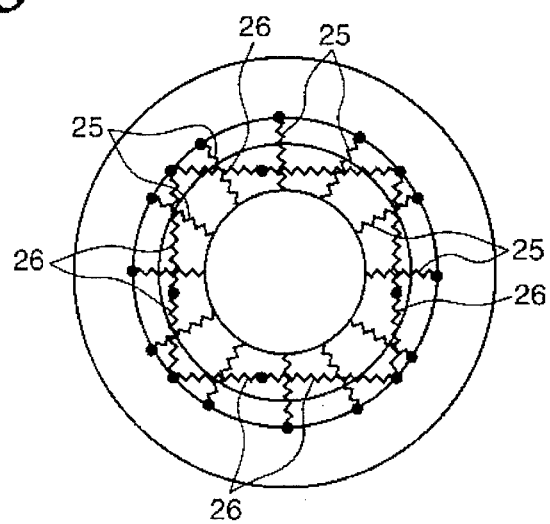
FIG. 8 is a plan view of the second embodiment shown in FIG. 7.

FIGS. 6 to 8 show a power storing apparatus 20 of a second embodiment of the present invention. Twenty power storing apparatuses 20 are installed in a substation of 100 m square and the load in the daytime and the load in the nighttime are averaged. It is possible to store a power of 24000 Kw×5 h in total.

In this second embodiment, the casings 4, 5 are arranged in the vertical direction with one laid on top of another so that the rotary shafts 9a of the rotors 9 are situated on the same axis. One block therefore constitutes a supporting means. The rotors 9 of the casings 4, 5 have the same mass and rotate in the opposite directions to each other at the same speed. An adapter plate 21 is fixed to the upper part of each of the casings 4 and 5, and a flange 22 for fixing the casing 4 (5) is provided at the lower part of each of the casings 4 and 5. The casings 4 and 5 are united into one body by connecting the adapter plate 21 of the casing 5 with the flange 22 of the casing 4 by bolts.

The power storing apparatus 20 is disposed in a cylindrical concrete pit 24 having a diameter of 7 m and a depth of 10 m which is fixed to the ground 23. The adapter plate 21 of the casing 4 which is laid on top of the casing 5 is suspended from the opening portion at the upper part of the concrete pit 24 by springs 25. The rigidity of the spring 25 is 10 t/m and the burden is about 20 t. The casings 4 and 5 are suspended by twelve springs 25 which extend in the radial directions, as shown in FIG. 8. The side wall portions of the casings 4 and 5 are pulled in the horizontal directions by springs 26, 27 which extend in the tangential directions of the peripheral walls of the casings 4, 5. The springs 26, 27 have a lower rigidity than the spring 25 and have a burden of about 10 t. The springs 27 prevent a horizontal dislocation of the power storing apparatus 20, while the springs 26 lessen the torque of the power storing apparatus 20. It goes without saying that air springs or rubber members are usable in place of the springs 26, 27. Alternately, the casings 4, 5 laid with one on top of another may be supported by air springs on the bottom portion of the concrete pit 24 in the same way as in the first embodiment.

Figure 9:
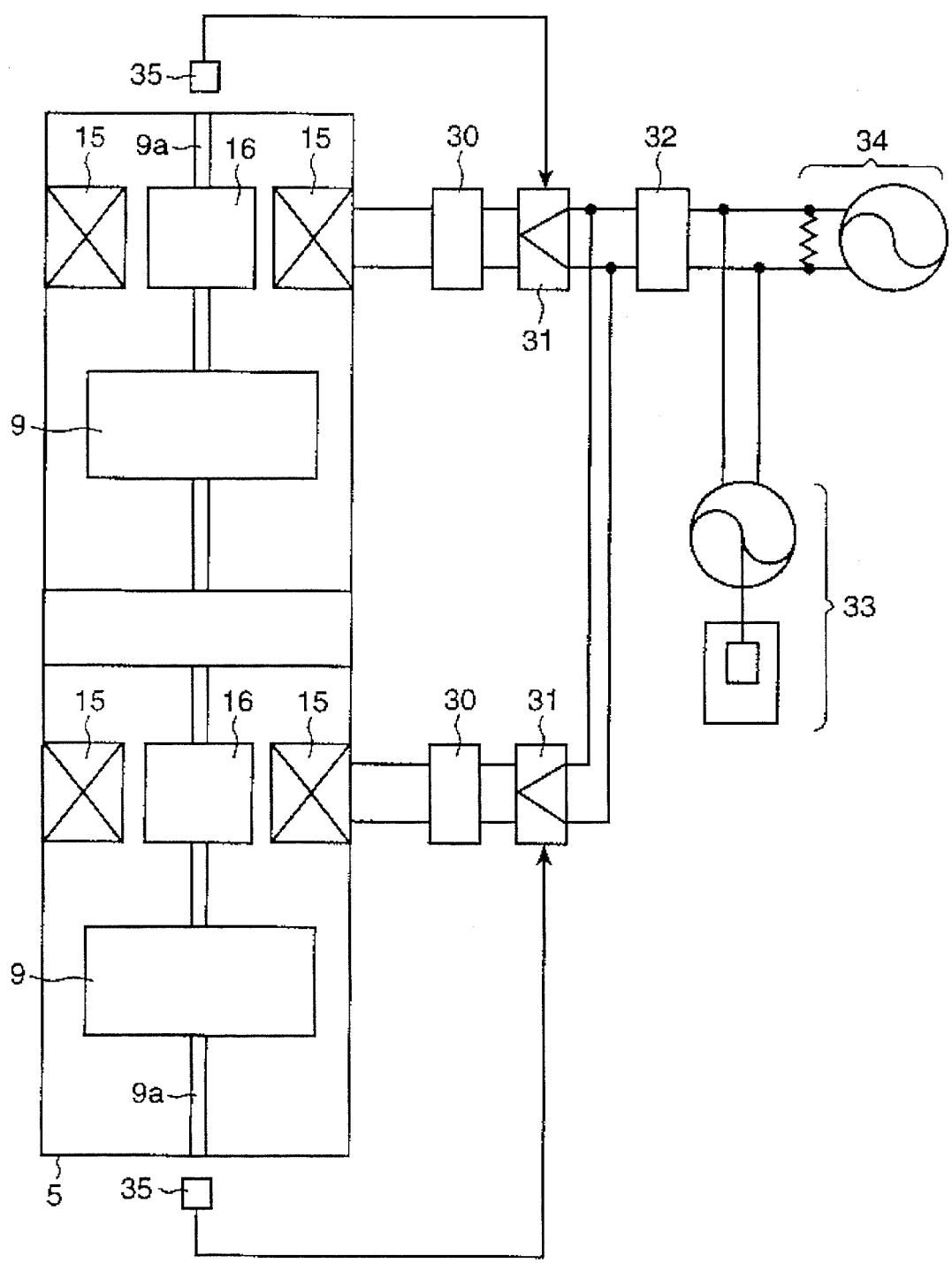
FIG. 9 is a schematic view of the electric system of the second embodiment of a power storing apparatus.
Figure 10:
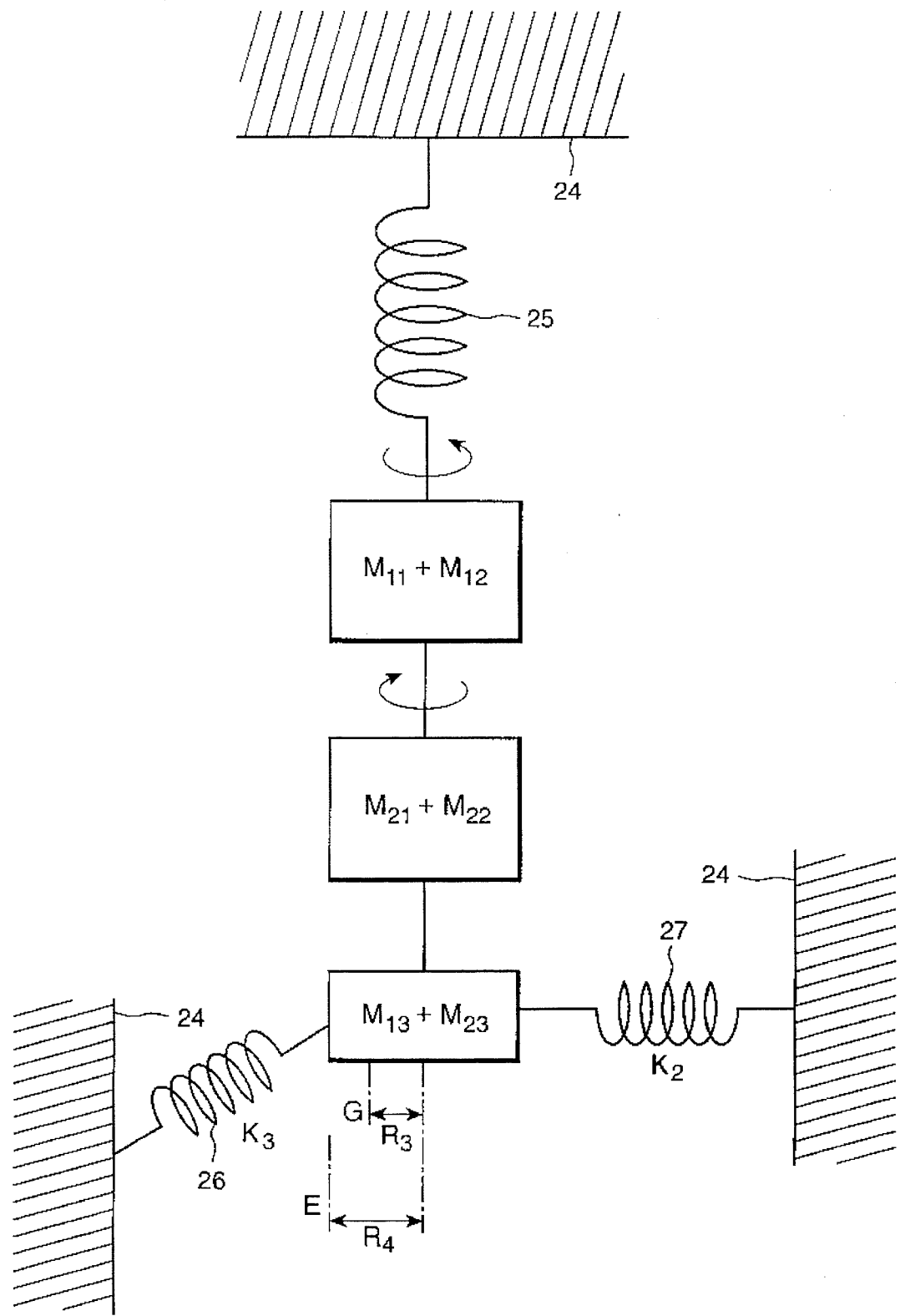
FIG. 10 is a schematic view of the dynamic system of the second embodiment.

FIGS. 9 and 10 schematically show the electric-system and the dynamic system, respectively, of the power storing apparatus of the second embodiment. In FIG. 9, an A/D transducer 30 is connected to the driving coil 15 which drives the armature 16 in the stationary state and which takes out the induction current of the armature 16 when it is rotated. An amplifier 31 (D/D transducer) is connected to the A/D transducer 30. A D/A transducer 32 is further connected to the amplifiers 31 of the casings 4, 5. A generator 33 and a load 34 are connected to the D/A transducer 32, and when the stationary armatures 16 are driven, the connection between the generator 33 and the load 34 is cut off and current is applied to the coils 15 so as to rotate the armatures 16 and, hence, the rotors 9. After the rotors 9 are rotated, the electrical connection between the generator 33 and the D/A transducer 32 is cut off so as to rotate the rotors 9 by the inertia force. In order to take out the electric power from the rotors 9 during the rotation of the rotors 9 by the inertia force, the load 34 is connected to the D/A transducer 32. Then, the induction current generated on the driving coils 15 is transduced into a direct current by the A/D transducers 30, and amplified by the amplifiers 31, transduced into an alternating current by the D/A transducer 32, and input to the load 34. Each reference numeral 35 represents a revolution counter for detecting the number of revolutions of the armature 16 and transmitting the data on the number of revolutions of the armature 16 to the corresponding amplifier 31 as a control signal for the amplification when the rotors 9 are rotated. When the rotors 9 are rotated by the inertia force, the revolution counters 35 also transmit the data on the number of revolutions of the armature 16 to the corresponding amplifiers 31 as control signals for the amplification.

FIG. 10 is a dynamic model for obtaining the natural frequency of the power storing apparatus 20, and the following letters were inserted. With regard to the first apparatus, it is assumed that the mass of the armature 3 is M11, the mass of the flywheel 5 is M12, and the mass of the casing 7 is M13. With respect to the second apparatus, M21, M22 and M23 can be obtained respectively. The spring constant of the spring 25 is K1, the spring constant of the spring 27 is K2, the spring constant of the spring 26 is K3, the equivalent radius of the secondary moment of the flywheel 11 which acts on the rotary shaft 9a is R3, and the horizontal distance between the center line of rotation of the rotary shaft 9a and the position to which the spring 26 for lessening the torque is attached is R4. The natural frequency A of the power storing apparatus 20 in the vertical direction, the natural frequency B thereof in the horizontal direction, and the natural frequency C in the rotational direction are represented by the following equations:

$$A = \frac{1}{2\pi} \sqrt{\frac{K_1}{M_{11} + M_{12} + M_{21} + M_{22} + M_{13} + M_{23}}}$$

$$B = \frac{1}{2\pi} \sqrt{\frac{K_2}{M_{11} + M_{12} + M_{21} + M_{22} + M_{13} + M_{23}}}$$

$$B = \frac{1}{2\pi} \sqrt{\frac{K_3 \cdot R_4^2}{(M_{13} + M_{23}) \cdot R_3^2}}$$

Figure 11:
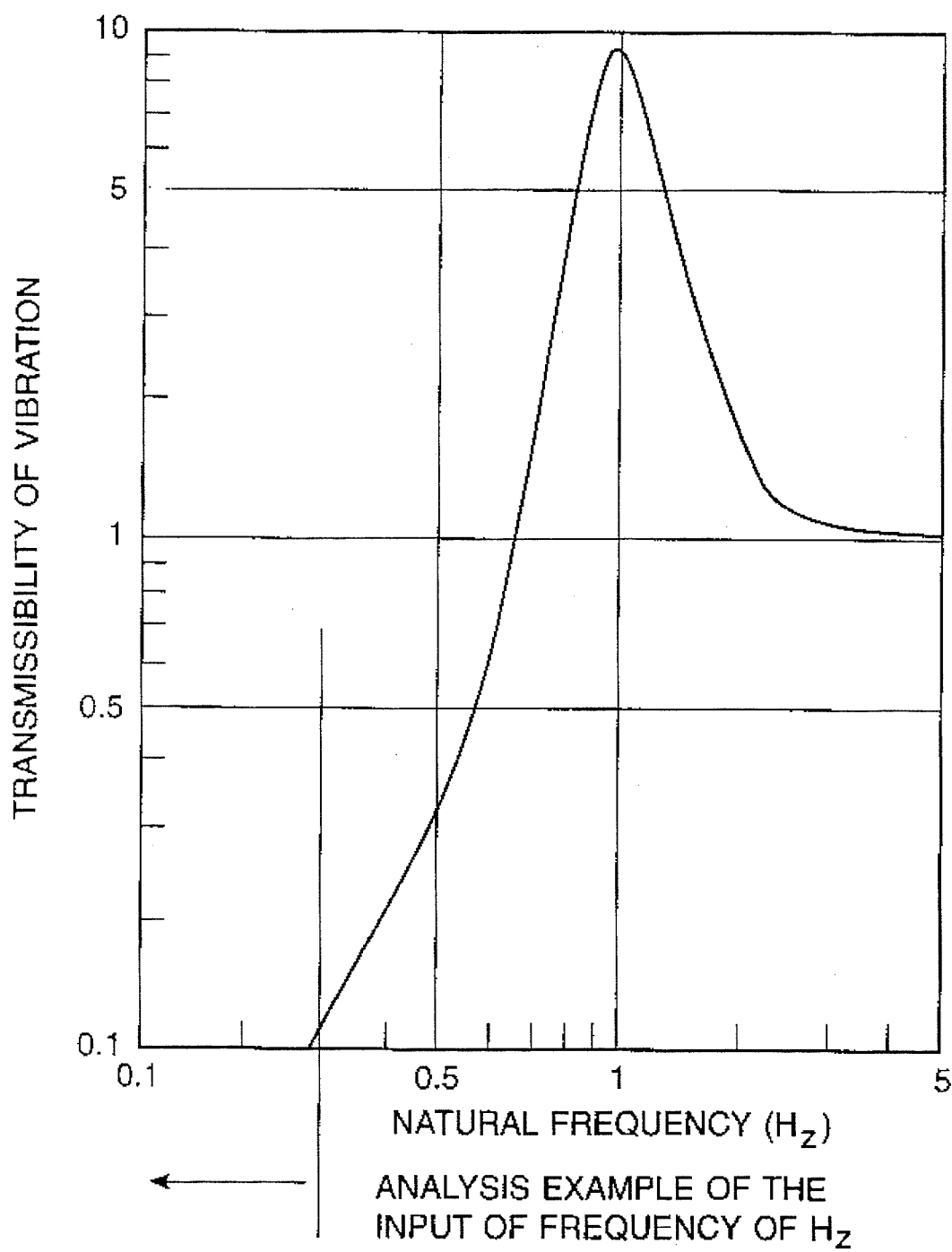
FIG. 11 is a graph of the transmissibility of vibration which changes with a change of the natural frequency of the whole apparatus of the second embodiment.

FIG. 11 is a graph showing the relationship between the natural frequencies of the power storing apparatus 20 in the vertical, horizontal and rotational directions and the transmissibility of vibration based on the above equations. The X-axis represents the natural frequency of the power storing apparatus 20, and the Y-axis represents the transmissibility of vibration (%) lessened by the springs 25, 26 and 27. In this graph, the frequency of the vibration of an earthquake is assumed to be 1 Hz.

According to this graph, the transmissibility of vibration reaches its maximum when the natural frequency (Hz) of the power storing apparatus 20 including the springs 25, 26 and 27 is 1 Hz. When the natural frequency is increased to more than 1 Hz, the transmissibility of vibration passes its peak and begins to reduce, but it remains above about 1%. However, when the natural frequency of the power storing apparatus 20 is set at less than 1 Hz, the transmissibility of vibration greatly reduces, and when the natural frequency of the power storing apparatus 20 is 0.3 Hz, the transmissibility of vibration becomes about 0.1%.

In other words, when the natural frequencies of the power storing apparatus 20 in the vertical, horizontal and rotational directions are set at not more than 0.3 Hz, respectively, the transmissibility of vibrations in the vertical, horizontal and rotational directions is not more than 0.1%, respectively. Therefore, if the natural frequencies of the power storing apparatus 20 in the vertical, horizontal and rotational directions are set at not more than 0.3 Hz, respectively, the ratio of the transmission of the vibration such as an earthquake to the power storing apparatus 20 is greatly reduced, so that the stability is secured even if the rotors 9 are rotated at a high speed.

In this way, according to this embodiment, since the casings 4, 5 are accommodated in the cylindrical concrete pit 24 with one laid on top of another, the power storing apparatus 20 not only has the same advantages as that of the first embodiment but also is further advantageous in that the safety is secured against an unlikely accident such as the dislocation of the casings 4, 5.

Industrial Applicability

As described above, according to a power storing apparatus of the present invention, even if the revolutions of a pair of rotors are accelerated or reduced when electric power is stored or discharged, the rotation torques as the counterforces of the rotors which are transmitted to the casings cancel each other, so that the power storing apparatus as a whole is prevented from rocking. In addition, since the power storing apparatus is supported on the ground by soft springs, the force transmitted from the ground to the apparatus at the time of an earthquake is very small, so that the risk of the rotors, the casings, the bearings, etc. being broken is greatly reduced. That is, according to the present invention, it is possible to design and produce a slim power storing apparatus having a small friction loss without lowering safety.

I claim:

1. A power storing apparatus comprising:
   at least one pair of rotors, said rotors rotating in opposite directions while producing the same rotation torque;
   at least one pair of casings, each of said casings defining a volume within which one of said rotors is rotatably supported;
   resilient means, interposed between said casings and the ground, for supporting said casings and absorbing vibration of an earthquake;
   each of said rotors including a rotary shaft providing support within one of said casings and flywheels, for maintaining rotation of said rotors by inertial forces, axially spaced along said rotary shaft and extending outward from said rotary shaft;

flanges in said volume defined by each of said casings and extending inward toward said rotary shaft from said casing, each of said flanges having a pair of said flywheels disposed adjacent to upper and lower surfaces thereof;

means for generating magnetic forces which rotate the rotors in said opposite directions;

superconductive pellets fixed on the upper surfaces of said flanges; and magnets provided on lower surfaces of said flywheels, each of said magnets facing one of said superconductive pellets so as to define one of a plurality of bearings by which said rotors are supported within said casings.

2. A power storing apparatus according to claim 1, wherein the rotary shafts of the rotors of said at least one pair of rotors are parallel to each other.

3. A power storing apparatus according to claim 1, wherein the rotary shafts of the rotors of said at least one pair of rotors are situated on the same axis.

* * * * *